United States Patent [19]
Butler

[11] 3,725,436
[45] Apr. 3, 1973

[54] 1-AMINO-3-AMINOALKYL-3-PHENYLINDOLINE COMPOUNDS

[76] Inventor: Donald E. Butler, 1449 Covington Drive, Ann Arbor, Mich. 48103

[22] Filed: Aug. 13, 1971

[21] Appl. No.: 171,762

Related U.S. Application Data

[63] Continuation-in-part of Ser. No. 4,127, Jan. 19, 1970, abandoned.

[52] U.S. Cl. ........260/326.11, 260/293.61, 260/325, 424/274
[51] Int. Cl. .............................................C07d 27/38
[58] Field of Search....................260/326.11, 293.61

[56] References Cited

UNITED STATES PATENTS 3,558,653   1/1971   Coyne et al. ....................260/326.11

*Primary Examiner*—Alex Mazel
*Assistant Examiner*—Joseph A. Narcavage
*Attorney*—Robert R. Adams et al.

[57] ABSTRACT

1-Amino-3-aminoalkyl-3-phenylindolines, in which the 1-amino group is substituted by an aralkyl group and by methyl or ethyl and the 3-aminoalkyl group is a dialkylaminoalkyl group or a heterocyclic aminoalkyl group; acid-addition salts thereof; and their production by reacting a 1-amino-3-aminaolkyl-3-phenyloxindole with a reducing agent. The compounds of the invention are useful as pharmacological agents that are active primarily as antidiarrheal agents.

6 Claims, No Drawings

1-AMINO-3-AMINOALKYL-3-PHENYLINDOLINE COMPOUNDS

CROSS REFERENCE TO RELATED APPLICATION

This application is a continuation-in-part of copending application Ser. No. 4,127, filed Jan. 19, 1970, and now abandoned.

SUMMARY AND DETAILED DESCRIPTION

The present invention relates to new indoline compounds that are useful as pharmacological agents and to methods for their production. More particularly, the invention relates to new 1-amino-3-aminoalkyl-3-phenylindoline compounds, which in free base form have the formula

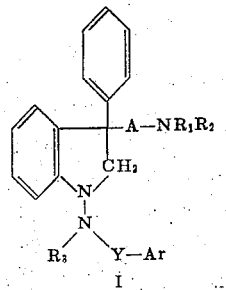

I and to pharmaceutically-acceptable acid-addition salts thereof; where each of $R_1$ and $R_2$ is an alkyl radical having not more than 3 carbon atoms or $R_1$ and $R_2$ are combined and together with the nitrogen atom to which they are attached represent 1-pyrrolidinyl, piperidino, hexahydro-1H-azepin-1-yl, 3-methylpiperidino, or 2,6-dimethylpiperidino; $R_3$ is methyl or ethyl; A represents ethylene, propylene, or trimethylene; Y represents methylene, ethylene, or ethylidene; and Ar represents phenyl, monosubstituted phenyl, in which the substituent is fluorine, chlorine, bromine, trifluoromethyl, methyl, methoxy, ethoxy, methylthio, ethylthio, or n-propylthio, dichlorophenyl, chlorofluorophenyl, chloromethoxyphenyl, dimethoxyphenyl, 2-furyl, or 2-thienyl.

In accordance with the invention, 1-amino-3-aminoalkyl-3-phenylindoline compounds having formula I above and acid-addition salts thereof are produced by reacting a 1-amino-3-aminoalkyl-3-phenyloxindole compound having the formula

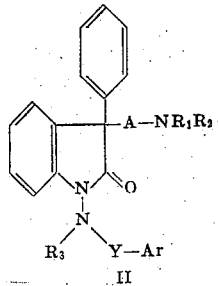

II with a reducing agent; where each of $R_1$, $R_2$, $R_3$, A, Y, and Ar has the aforementioned significance. Reducing agents that may be employed include lithium aluminum hydride, lithium aluminum hydride-aluminum chloride, sodium borohydride-aluminum chloride, sodium trimethoxyborohydride, aluminum hydride, aluminum hydride-aluminum chloride, diisobutyl aluminum hydride, and sodium bis(2-methoxy-ethoxy)aluminum hydride. Of these, lithium aluminum hydride-aluminum chloride is preferred. The reaction is best carried out in an anhydrous, unreactive, non-hydroxylic solvent medium. Suitable solvents include various ethers, such as diethyl ether, dibutyl ether, tetrahydrofuran, 1,2-dimethoxyethane, and diethylene glycol dimethyl ether, N-ethylmorpholine, and aromatic hydrocarbons, such as toluene and xylene, as well as combinations of these. A preferred solvent medium is a mixture of diethyl ether and toluene. The temperature and duration of the reaction are not critical and may be varied widely, the temperature from 20° to 120° C. and the duration from several minutes to 5-10 hours. A preferred temperature is one in the range of from 35° to 65° C., and at such a temperature, the reaction with the preferred lithium aluminum hydride-aluminum chloride reducing agent occurs spontaneously and is virtually complete upon completion of the addition of the reducing agent to the reaction mixture. While equivalent quantities of the oxindole starting material and the reducing agent may be used, best results are obtained by employing the reducing agent in moderate excess. Following initial reaction with the complex metal hydride reducing agent, the reaction mixture is hydrolyzed with an aqueous medium, such as water, dilute aqueous inorganic acids or bases, and other media containing water. The product of the reaction can then be isolated either in free base or acid-addition salt form by suitable adjustment of the pH of the reaction mixture.

The 1-amino-3-aminoalkyl-3-phenyloxindole compounds having formula II that are used as starting materials in the foregoing process are prepared by reacting an alkali metal salt, preferably the sodium salt, of a 1-amino-3-phenyloxindole compound having the formula

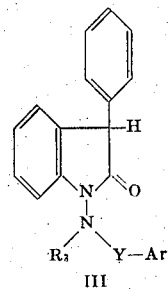

III with a haloalkylamine compound having the formula $$X-A-NR_1R_2 \qquad (IV)$$

where each of $R_1$, $R_2$, $R_3$, A, Y, and Ar has the same meaning as previously given, and X is halogen, preferably chlorine or bromine. The 1-amino-3-phenyloxindoles of formula III are in turn prepared by reacting α-chlorodiphenylacetyl chloride with a substituted hydrazine compound having the formula

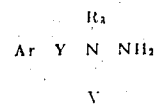

V where Ar, Y, and $R_3$ are as defined previously. The required substituted hydrazines are prepared by a variety of methods as illustrated in detail hereinafter.

The compounds of the invention can exist in the free base form having formula I or in the form of an acid-addition salt. Pharmaceutically-acceptable acid-addition salts are formed with a variety of inorganic and organic acids, such as hydrochloric, hydrobromic, hydriodic, sulfuric, nitric, phosphoric, acetic, benzoic, citric, maleic, malic, tartaric, succinic, gluconic, ascorbic, sulfamic, pamoic, and related acids. The various acid-addition salts are readily formed; however, in most cases, the salts are difficult to obtain in a crystalline state and thus cannot readily be characterized by means of a melting point, because they are strongly solvated. Nevertheless, the free bases and salts are generally equivalent for purposes of the invention, except that one or the other may be preferred for particular solubility properties. The compounds of the invention are also capable of existing in optically active forms.

The compounds of the invention are new chemical compounds that are useful pharmacological agents. As pharmacological agents, they are active primarily as antidiarrheal agents. Their activity in this regard is demonstrable and quantitatively measurable in a test designed to measure the ability of a test compound to inhibit stomach emptying in rats of a test meal containing radioactive barium. The test is carried out as follows.

Male rats, weighing 135–150 grams each, are fasted overnight and assigned to test or carrier control groups by random block design, with 10–20 rats per group. The test compound or carrier is then administered orally. Thirty minutes following administration of the test compound, all the rats are given, by gavage, 2 ml. of a test meal consisting of a 20 percent $BaSO_4$-$Ba^{133}$ suspension in methocelsaline. After another thirty-minute period, the rats are sacrificed and their stomachs and small intestines are removed and divided into segments. The gamma emissions from the $Ba^{133}$ label are then measured to determine the amount of meal retained in each segment, and the percentage of the administered test meal emptied from each segment is computed. The effect of the test compounds in inhibiting stomach emptying is evaluated by comparing the computed mean percentages for the test groups with those of the control groups. Inhibition of stomach emptying is used as the test criterion because it has been found that compounds that inhibit stomach emptying also inhibit emptying from the various segments of the small intestine.

The results obtained in the test described above for some representative compounds of the present invention are given in the following table. In this table, the activity of each compound is expressed as the lowest dose that gave a significant difference ($P \leq 0.05$) in stomach emptying between the test group and the carrier control group. The table also shows the result obtained for morphine, which is known to be useful as an antidiarrheal agent. The demonstration of activity for morphine indicates the validity of the test procedure for determining anti-diarrheal activity.

INHIBITION OF STOMACH EMPTYING

| Compound | Minimum Effective Dose, mg. base/kg. |
|---|---|
| 1-[(o-chlorobenzyl)methylamino]-3-[2-(diethylamino)ethyl]-3-phenylindoline | 6.25 |
| 1-(benzylmethylamino)-3-[3-(2,6-dimethylpiperidino)propyl]-3-phenylindoline | 25.0 |
| 3-[2-(diethylamino)ethyl]-1-[(m-methoxybenzyl)methylamino]-3-phenylindoline | 6.25 |
| 3-[2-(dimethylamino)ethyl]-1-[p-methoxybenzyl)methylamino]-3-phenylindoline | 3.12 |
| 3-[2-(diethylamino)ethyl]-1-[(p-methoxybenzyl)methylamino]-3-phenylindoline | 1.56 |
| 3-[2-(diethylamino)ethyl]-1-{methyl[o-(methylthio)benzyl]amino}-3-phenylindoline | 12.5 |
| 1-[(2-chloro-3-methoxybenzyl)methylamino]-3-[2-(diethylamino)ethyl]-3-phenylindoline | 1.25 |
| morphine* | 5.0 |

*Administered as the sulfate salt.

The antidiarrheal activity of the compounds of the invention is also demonstrable and quantitatively measurable in a test that is designed to measure the effect of a test compound in decreasing fecal output in rats. This test is carried out as follows.

Carworth Farm male rats, randomly selected from storage cages and weighing between 110 and 130 grams each, are used in the study. The animals are housed individually or three rats per cage. Each cage has a one-half inch floor mesh (four squares per square inch) and is fitted below the floor with a four-sided, slotted, three-inch deflecting tray sloping down and inward at 45° to insure that the rat feces drop below the cage within the confines of a collecting sheet of paper. The collection sheet under each cage rests on a larger sheet of paper that is movable by means of attachment to a rotating bar connected to a time controlled motor.

The test compounds are administered orally between 3:30 and 4:00 P.M. on the day of the test. Because rats are most active in darkness, at 5:00 P.M. the lights in the test room are automatically turned off. Following an eight-hour collection period, at 12:00 midnight, the collection papers with their contents are moved from under the test cages. The feces collected from each cage are transferred to a tared metal pan and dried in an oven at 150° C. under reduced pressure. The dried feces are then weighed and the values obtained are converted to weight per 100 grams of rat body weight as recorded just prior to dosing.

A carrier control group is run with each test and the mean fecal weight for this group is arbitrarily designated as 100 per cent fecal output. To determine the percentage of fecal output in the treated rats, the mean fecal weight of each treatment group is divided by the mean fecal weight of the carrier control group and the resulting value is multiplied by 100. The percentage reduction in fecal output is then obtained by subtraction from 100 per cent.

The test compounds are administered in solution in dilute hydrochloric acid, or suspended in 0.5 percent aqueous methylcellulose (Methocel), or for those compounds that are incompatible with Methocel, in solution in olive oil. Administration is in a volume of 0.5 cm.³ per 100 grams of rat body weight. To compensate for the time interval needed for administration, the test compounds and the carrier control vehicle are coded and randomized in a block design. During the test, the rats are given food pellets and water ad libitum.

The evaluation of potential antidiarrheal agents by the method described above is normally carried out in two stages. In an initial screening stage, each test compound is administered to eight rats housed individually in the test cages. For the majority of test compounds, the initial dosage level is 125 mg./kg., calculated as active moiety. If this dosage level reduces fecal output by at least 50 per cent, the compound is further evaluated to determine its $ED_{50}$, that is, the estimated dose that reduces fecal output by 50 per cent. Variability in fecal output among identically treated rats is determined by calculating the coefficient of variation. A value for this coefficient of 30 per cent or less is necessary for the acceptance of the test results. If the variability is greater than 30 percent, the test compound is screened again at 125 mg./kg., this time in 24 rats divided into eight groups housed three per cage.

To determine the $ED_{50}$, the test compound is administered at different dosage levels to two separate treatment groups of 24 rats each, which are further broken down into eight groups of three rats each. The percentage of fecal output for each dosage level is plotted on semilogarithmic paper and the estimated $ED_{50}$ is obtained by joining the two points and determining at what dosage level the line crosses the 50 percent level. In this determination, a coefficient of variation of 15 per cent or less is necessary for acceptance of the results.

Antidiarrheal activity data obtained in the foregoing test procedure are presented for representative compounds of the invention in the Examples that follow. The activity is expressed there either by the $ED_{50}$, as follows: $ED_{50}$(Fecal Output, abbreviated F.O.) — dosage in mg./kg.; or where the $ED_{50}$ value could not readily be obtained, by the percentage reduction of fecal output at a given dosage, as follows: F. O. reduction — percentage at dosage, mg./kg.

As in the "inhibition of stomach emptying" test described earlier, antidiarrheal activity for morphine has been demonstrated in the fecal output test. When administered as the sulfate salt, morphine was found to have an $ED_{50}$ of 28 mg./kg.

The compounds of the invention are preferably administered orally, although parenteral administration can also be used. They can be combined with either a solid or liquid carrier or diluent and made available in varying amounts in such pharmaceutical forms as tablets, capsules, powders, and aqueous and non-aqueous suspensions and solutions.

The invention is illustrated by the following examples. The 1-amino-3-aminoalkyl-3-phenylindoline compounds of the present invention, prepared by the methods described in the examples that follow, were obtained, except where otherwise indicated, as viscous oily liquids, which could not readily be distilled because they partially decomposed upon heating nor could they be made to crystallize. In the exceptional cases, the compounds either crystallized upon prolonged standing, or boiling points could be obtained by using a short path distillation apparatus and a high vacuum pump, such as a mercury diffusion pump, to achieve a pressure in the range of 0.005–0.200 mm. Hg. Although most of the compounds could not be characterized by means of a boiling point or a melting point, the chemical structures of the compounds produced as described in the following examples were confirmed by means of ultraviolet, infrared, and nuclear magnetic resonance spectra, which were consistent with the spectra to be expected of this class of indoline compounds.

EXAMPLE 1

To a suspension of 9.0 g. of lithium aluminum hydride in 1.5 liters of ether at room temperature is added a solution of 20.0 g. of 1-[(o-chlorobenzyl)methylamino]-3-[2-(diethylamino)ethyl]-3-phenyloxindole, dissolved in a minimum amount of warm tetrahydrofuran and 150 ml. of ether. The resulting mixture is gently heated under reflux while a solution of 8.8 g. of aluminum chloride in 25 ml. of toluene and 200 ml. of ether is added in portions. After an additional hour of heating, the mixture is cooled and treated successively with 17 ml. of water, 38.0 g. of 25 percent aqueous sodium hydroxide, and 15 ml. of water. The resulting mixture obtained is filtered, and the filtrate is concentrated under reduced pressure. The residue is dissolved in a minimum amount of ether, and the ethereal solution is treated with activated charcoal and then poured onto a column of neutral alumina. The column is eluted with ether, and the combined ether eluates are concentrated under reduced pressure to give 1-[(o-chlorobenzyl)methylamino]-3-[2-(diethylamino)ethyl]-3-phenylindoline, obtained as a pale yellow viscous oil that is purified by distillation after drying at 120° C. at a pressure of 0.15 mm. Hg for 7 hours; b.p. 158°–162° C./0.175 mm. Hg; $ED_{50}$(F.O.) — 18. The monohydrochloride salt of this free base product is prepared by dissolving the free base in 2-propanol and treating the solution with an excess of 2-propanolic hydrogen chloride. The free base product is converted to a salt with succinic acid by reacting it with an equivalent quantity of succinic acid in 2-propanol. A salt with citric acid is obtained by mixing solutions of the free base and citric acid in methanol and concentrating the mixture to a small volume.

EXAMPLE 2

Utilizing the general procedure described in Example 1 above, the following 1-amino-3-aminoalkyl-3-phenylindoline compounds are obtained from the reduction of the corresponding 1-amino-3-aminoalkyl-3-phenyloxindole precursor. In each case, the molar ratios of the reactants are approximately those employed in Example 1 above.

1. 1-(Benzylmethylamino)-3-[3-(dimethylamino)propyl]3-phenylindoline.
2. 1-(Benzylmethylamino)-3-[3-(diethylamino)propyl]-3-phenylindoline.
3. 1-(Benzylmethylamino)-3-phenyl-3-[2-(1-pyrrolidinyl)ethyl]indoline; F.O. reduction — 38 at 100.
4. 1-(Benzylmethylamino)-3-phenyl-3-(2-piperidinoethyl)indoline.
5. 1-(Benzylmethylamino)-3-phenyl-3-(3-piperidinopropyl)indoline.
6. 1-(Benzylmethylamino)-3-[3-(3-methylpiperidino)-propyl]-3-phenylindoline; F.O. reduction — 24 at 50.
7. 1-(Benzylmethylamino)-3-[3-(2,6-dimethylpiperidino)propyl]-3-phenylindoline.

8. 3-[2-(Dimethylamino)ethyl]-1-(methylphenethyl-amino)-3-phenylindoline.
9. 3-[2-(Diethylamino)ethyl]-1-(methylphenethyl-amino)-3-phenylindoline; $ED_{50}(F.O.) - 67$.
10. 1-(Benzylethylamino)-3-[2-(dimethylamino)ethyl]-3-phenylindoline.
11. 1-(Benzylethylamino)-3-[2-(diethylamino)ethyl]-3-phenylindoline; $ED_{50}(F.O.) - 66$.
12. 1-(Benzylethylamino)-3-[3-(dimethylamino)propyl]3-phenylindoline.
13. 3-[2-(Dimethylamino)ethyl]-1-[methyl($\alpha$-methyl-benzyl)amino]-3-phenylindoline.
14. 3-[2-(Diethylamino)ethyl]-1-[methyl($\alpha$-methyl-benzyl)amino]-3-phenylindoline; $ED_{50}(F.O.) - 71$.
15. 3-[3-(Dimethylamino)propyl]-1-[methyl($\alpha$-methyl-benzyl)amino]-3-phenylindoline.
16. 1-[(o-Chlorobenzyl)methylamino]-3-[3-(diemthyl-amino)propyl]-3-phenylindoline.
17. 1-[(o-Chlorobenzyl)methylamino]-3-[3-(diethyl-amino)propyl]-3-phenylindoline.
18. 1-[(o-Chlorobenzyl)methylamino]-3-phenyl-3-(2-piperidinoethyl)indoline; $ED_{50}(F.O.) - 61$.
19. 1-[(m-Chlorobenzyl)methylamino]-3-[2-(diethyl-amino)ethyl]-3-phenylindoline.
20. 1-[(p-Chlorobenzyl)methylamino]-3-[2-(dimethyl-amino)ethyl]-3-phenylindoline.
21. 1-[(p-Chlorobenzyl)methylamino]-3-[2-(diethyl-amino)ethyl]-3-phenylindoline.
22. 1-[(p-Chlorobenzyl)methylamino]-3-[3-(dimethyl-amino)propyl]-3-phenylindoline.
23. 1-[(o-Bromobenzyl)methylamino]-3-[3-(dimethyl-amino)propyl]-3-phenylindoline.
24. 1-[(o-Bromobenzyl)methylamino]-3[2-(diethyl-amino)ethyl]-3-phenylindoline; $ED_{50}(F.O.) - 45$.
25. 3-[2-(Diethylamino)ethyl]-1-[(o-fluorobenzyl)-methylamino]-3-phenylindoline; $ED_{50}(F.O.) - 26$.
26. 3-[2-(Diethylamino)ethyl]-1-[(p-fluorobenzyl)-methylamino]-3-phenylindoline.
27. 3-[2-(Diethylamino)ethyl]-1-[methyl(o-methyl-benzyl)amino]-3-phenylindoline.
28. 3-[3-(Dimethylamino)propyl]-1-[methyl(o-methyl-benzyl)amino]-3-phenylindoline; F.O. reduction — 49 at 125.
29. 3-[2-(Diethylamino)ethyl]-1-{methyl[o-(trifluoromethyl)benzyl]amino}-3-phenylindoline; F.O. reduction — 39 at 100.
30. 3-[2-(Dimethylamino)ethyl]-1-[(o-methoxybenzyl)-methylamino]-3-phenylindoline.
31. 3-[2-(Diethylamino)ethyl]-1-[(o-methoxybenzyl)-methylamino]-3-phenylindoline.
32. 3-[2-(Dimethylamino)ethyl]-1-[(m-methoxybenzyl)-methylamino]-3-phenylindoline.
33. 3-[2-(Diethylamino)ethyl]-1-[(m-methoxybenzyl)-methylamino]-3-phenylindoline, b.p. 162°–163° C./0.200 mm. Hg; $ED_{50}(F.O.) - 14$.
34. 3-[3-(Dimethylamino)propyl]-1-[(m-methoxybenzyl)-methylamino]-3-phenylindoline.
35. 3-[2-(Dimethylamino)ethyl]-1-[(p-methoxybenzyl)-methylamino]-3-phenylindoline.
36. 3-[2-(Diethylamino)ethyl]-1-[(p-methoxybenzyl)-methylamino]-3-phenylindoline; crystallized upon prolonged standing, m.p. 60°–62° C.; $ED_{50}(F.O.) - 14$.
37. 3-[3-(Dimethylamino)propyl]-1-[(p-methoxybenzyl)-methylamino]-3-phenylindoline.
38. 3-[2-(Diethylamino)ethyl]-1-[(o-ethoxybenzyl)-methylamino]-3-phenylindoline; $ED_{50}(F.O.) - 30$.
39. 3-[3-(Dimethylamino)propyl]-1-{methyl[o-(methylthio)benzyl]amino}-3-phenylindoline.
40. 3-[2-(Diethylmaino)ethyl]-1-{methyl[o-(methylthio)benzyl]amino}-3-phenylindoline; $ED_{50}(F.O.) - 49$.
41. 3-[3-(Diethylamino)propyl]-1-{methyl[o-(methylthio)benzyl]amino}-3-phenylindoline.
42. 1-{Methyl[o-(methylthio)benzyl]amino}-3-phenyl-3-(2-piperidinoethyl)indoline.
43. 3-[2-(Hexahydro-1H-azepin-1-yl)ethyl]-1-{methyl[o-(methylthio)benzyl]amino}-3-phenylindoline, m.p.85.5°–87° C.; $ED_{50}(F.O.) - 71$.
44. 3-[2-(Diethylamino)ethyl]-1-{[o-(ethylthio)-benzyl]methylamino}-3-phenylindoline; $ED_{50}(F.O.) - <50$.
45. 3-[2-(Diethylamino)ethyl]-1-{methyl[o-(propylthio)benzyl]amino}-3-phenylindoline; $ED_{50}(F.O.) - 34$.
46. 3-[2-(Dimethylamino)ethyl]-1-(furfurylmethyl-amino)-3-phenylindoline.
47. 3-[2-(Diethylamino)ethyl]-1-(furfurylmethyl-amino)-3-phenylindoline.
48. 3-[3-(Dimethylamino)propyl]-1-(furfuryl-methyl-amino)-3-phenylindoline; $ED_{50}(F.O.) - 100$.
49. 3-[3-(Dimethylamino)propyl]-1-(methyl-2-thenylamino)-3-phenylindoline; $ED_{50}(F.O.) - 88$.
50. 3-[2-(Diethylamino)ethyl]-1-(methyl-2-thenylamino)-3-phenylindoline.
51. 3-[2-(Diethylamino)ethyl]-1-{methyl[p-(methyl-thio)benzyl]amino}-3-phenylindoline.
52. 3-[2-(Diethylamino)ethyl]-1-[(2,3-dimethoxybenzyl)methylamino]-3-phenylindoline; $ED_{50}(F.O.) - 5$.
53. 3-[2-(Diethylamino)ethyl]-1-(methylveratryl-amino)-3-phenylindoline.
54. 3-[2-(Diethylamino)ethyl]-1-[(2,5-dimethoxybenzyl)methylamino]-3-phenylindoline; $ED_{50}(F.O.) - 17$.
55. 1-[(2-Chloro-4-methoxybenzyl)methylamino]-3-[2-(diethylamino)ethyl]-3-phenylindoline.
56. 1-[(4-Chloro-2-methoxybenzyl)methylamino]-3-[2-(diethylamino)ethyl]-3-phenylindoline; $ED_{50}(F.O.) - 21$.
57. 1-[(5-Chloro-2-methoxybenzyl)methylamino]-3-[2-(diethylamino)ethyl]-3-phenylindoline.
58. 1-[(2,6-Dichlorobenzyl)methylamino]-3-[2-(diethylamino)ethyl]-3-phenylindoline; F.O. reduction — 39 at 100.
59. 1-[(2-Chloro-6-fluorobenzyl)methylamino]-3-[2-(diethylamino)ethyl]-3-phenylindoline; $ED_{50}(F.O.) - 50$.

EXAMPLE 3

Utilizing the general procedure described in Example 1 above, from the reduction of 1-[(2-chloro-3-methoxybenzyl)-methylamino]-3-[2-(diethylamino)ethyl]-3-phenyloxindole by lithium aluminum hydride-aluminum chloride there is obtained 1-[(2-chloro-3-methoxybenzyl)methylamino]-3-[2-(diethyl-amino)ethyl]-3-phenylindoline; $ED_{50}(F.O.) - 2.5$. The mono-L(+)-tartrate salt of 1-[(2-chloro-3-methoxybenzyl)methyl-amino]-3-[2-

(diethylamino)ethyl]-3-phenylindoline is obtained by mixing equivalent ethanolic solutions of the free base and L(+)-tartaric acid and isolating the solid salt that crystallizes; m.p. 172°–174° C. In a similar manner, the following salts of 1-[(2-chloro-3-methoxybenzyl)methyl-amino]-3-[2-(diethylamino)ethyl]-3-phenylindoline are also obtained: mono-DL-malate, m.p. 110°–112° C.; mono-D(-)- maleate, m.p. 118°–120° C.; mono-DL-maleate, m.p. 120°–121° C.; and monocitrate, m.p. 120°–122° C.

EXAMPLE 4

Utilizing the general procedure described in Example 1, the following mixtures of isomeric 1-amino-3-aminoalkyl-3-phenylindoline compounds are obtained from the reduction of a mixture of corresponding isomeric 1-amino-3-aminoalkyl-3-phenyloxindole compounds. In each case, the molar ratios of the reactants are approximately those employed in Example 1 above. No attempt was made to separate the individual isomers.

1. Mixture of 1-(benzylmethylamino)-3-[2-(dimethyl-amino)-1-methylethyl]-3-phenylindoline and 1-(benzylmethyl-amino)-3-[2-(dimethylamino)propyl]3-phenylindoline.

2. Mixture of 1-[(o-chlorobenzyl)methylamino]-3-[2-(dimethylamino)propyl]-3-phenylindoline and 1-[(o-chloro-benzyl)methylamino]-3-[2-(dimethylamino)-1-methylethyl]-3-phenylindoline.

3. Mixture of 1-[(o-chlorobenzyl)methylamino]-3-[2-(diethylamino)propyl]-3-phenylindoline and 1-[(o-chlorobenzyl)methylamino]-3-[2-(diethylamino)-1-methyl-ethyl]-3-phenylindoline; $ED_{50}(F.O.) - 30$.

4. Mixture of 3-[2-(dimethylamino)-1-methylethyl]-1-{methyl[o-(methylthio)benzyl]amino}-3-phenylindoline and 3-[2-(dimethylamino)propyl]-1-{methyl[o-(methylthio)benzyl]-amino}  -3-phenylindoline; $ED_{50}(F.O.) - 34$.

5. Mixture of 3-[2-(diethylamino)-1-methylethyl]-1-{methyl[o-(methylthio)benzyl]amino}-3-phenylindoline and 3-[2-(diethylamino)propyl]-1-{methyl[o-(methylthio)benzyl]-amino}-3-phenylindoline.

STARTING MATERIALS

The various starting materials employed in the foregoing Examples and intermediates required for their preparation are obtained by the methods described in the following.

I. 1-Amino-3-aminoalkyl-3-phenyloxindoles.

A. 1-[(o-Chlorobenzyl)methylamino]-3-[2-(diethylamino)ethyl]-3-phenyloxindole. To a mixture of 7.5 g. of a 55 percent sodium hydride in mineral oil dispersion (0.17 mole of sodium hydride) and 800 ml. of tetrahydrofuran, stirred in a nitrogen atmosphere, is first added, in portions, 52 g. (0.14 mole) of 1-[(o-chlorobenzyl)methylamino]-3-phenyloxindole, then a solution of 28 g. (0.21 mole) of β2-chlorotriethylamine in 150 ml. of toluene. The resulting reaction mixture is stirred and heated under reflux for 16 hours, cooled, and poured slowly into water. The organic phase is separated and extracted with dilute hydrochloric acid. The acidic extract is then made alkaline with 50 percent aqueous sodium hydroxide, and the alkaline mixture is extracted with ether. The ether extract is washed with water, dried, and evaporated to dryness to give a residue of 1-[(o-chlorobenzyl)methylamino]-3-[2-(diethylamino)-ethyl]-3-phenyloxindole, which is purified by distillation under reduced pressure; b.p. 214°–215° C./0.46 mm. Hg.

B. Utilizing the general procedure described in A above, the following 1-amino-3-aminoalkyl-3-phenyloxindoles are obtained from the reaction of the 3-phenyloxindole compound and haloalkylamine compound designated below in the presence of sodium hydride. In each case, the molar ratios of the three reactants are approximately those employed in A above.

1. 1-(Benzylmethylamino)-3-[3-(dimethylamino)-propyl]-3-phenyloxindole; from 1(benzyl-methylamino)-3-phenyloxindole and 3-chloro-N,N-dimethylpropylamine. The monohydrochloride salt is prepared by dissolving the free base product in 2-propanol and treating the solution with an excess of 2-propanolic hydrogen chloride; m.p. 189°–191° C., following crystallization from 2-propanol-ether.

2. 1-(Benzylmethylamino)-3-[3-(diethylamino)-propyl]-3-phenyloxindole, b.p. 192°–196° C./0.15 mm. Hg; from 1-(benzylmethylamino)-3-phenyloxindole and 3-chloro-N,N-di-ethylpropylamine.

3. 1-(Benzylmethylamino)-3-phenyl-3-[2-(1-pyrrolidinyl)ethyl]oxindole, from 1-(benzylmethylamino)-3-phenyloxindole and N-(2-chloroethyl)pyrrolidine. The mono-hydrochloride salt, prepared as in (1) above, has m.p. 211.5°–212.5° C., following crystallization from 2-propanol-ether.

4. 1-(Benzylmethylamino)-3-phenyl-3-(2-piperidinoethyl)oxindole, b.p. 215°–225° C./0.25 mm. Hg; from 1-(benzyl-methylamino)-3-phenyloxindole and N-(2-chloroethyl)piperidine.

5. 1-(Benzylmethylamino)-3-phenyl-3-(3-piperidino-propyl)oxindole (monohydrochloride, m.p. 207°–209° C., crystallized from 2-propanol-ether); from 1-(benzylmethyl-amino)-3-phenyloxindole and N-(3-chloropropyl)piperidine.

6. 1-(Benzylmethylamino)-3-[3-(3-methyl-piperidino)-propyl]-3-phenyloxindole, b.p. 204°–207° C./0.21 mm. Hg; from 1-(benzylmethylamino)-3-phenyloxindole and N-(3-chloro-propyl)-3-methyl-piperidine.

7. 1-(Benzylmethylamino)-3-[3-(2,6-dimethyl-piperidino)-propyl]-3-phenyloxindole, b.p. 210°–215° C./0.30 mm. Hg; from 1-(benzylmethylamino)-3-phenyloxindole and N-(3-chloropropyl)-2,6-dimethyl-piperidine.

8. 3-[2-(Dimethylamino)ethyl]-1-(methylphenethyl-amino-3-phenyloxindole (monohydrochloride, m.p. 183°–184.5° C.); from 1-(methylphenethylamino)-3-phenyloxindole and 2-chloro-N,N-dimethylethylamine.

9. 3-[2-(Diethylamino)ethyl]-1-(methylphenethyl-amino)-3-phenyloxindole, b.p. 180°–183° C./0.31 mm. Hg; from 1-(methylphenethylamino)-3-phenyloxindole and β-chloro-triethylamine.

10. 1-(Benzylethylamino)-3-[2-(dimethylamino)-ethyl]-3-phenyloxindole, m.p. 92.5°–95° C.; from 1-(benzylethylamino)-3-phenyloxindole and 2-chloro-N,N-dimethylethylamine.

11. 1-(Benzylethylamino)-3-[2-(diethylamino)ethyl]-3-phenyloxindole (dihydrochloride, m.p. 176°–178.5° C.); from 1-(benzylethylamino)-3-phenyloxindole and β-chlorotriethylamine.

12. 1-(Benzylethylamino)-3-[3-(dimethylamino)-propyl]-3-phenyloxindole (monohydrochloride, m.p. 181°-184° C.); from 1-(benzylethylamino)-3-phenyloxindole and 3-chloro-N,N-dimethylpropylamine.

13. 3-[2-(Dimethylamino)ethyl]-1-[methyl($\alpha$-methylbenzyl)amino]-3-phenyloxindole (monohydrobromide, m.p. 223°-226° C.); from 1-[methyl($\alpha$-methylbenzyl)amino]-3-phenyloxindole and 2-chloro-N,N-dimethylethylamine.

14. 3-[2-(Diethylamino)ethyl]-1-[methyl($\alpha$-methylbenzyl)amino]-3-phenyloxindole, m.p. 116.5°-118.5° C.; from 1-[methyl($\alpha$-methylbenzyl)amino]-3-phenyloxindole and $\beta$-chlorotriethylamine.

15. 3-[3-(Dimethylamino)propyl]-1-[methyl($\alpha$-methylbenzyl)amino]-3-phenyloxindole (monohydrochloride, m.p. 196°-197° C.); from 1-[methyl($\alpha$-methylbenzyl)amino]-3-phenyloxindole and 3-chloro-N,N-dimethylpropylamine.

16. 1-[(o-Chlorobenzyl)methylamino]-3-[3-(dimethylamino)propyl]-3-phenyloxindole (monohydrochloride, m.p. 209°-211.5° C., crystallized from 2-propanol-ether); from 1-[(o-chlorobenzyl)methylamino]-3-phenyloxindole and 3-chloro-N,N-dimethylpropylamine.

17. 1-[(o-Chlorobenzyl)methylamino]-3-[3-(diethyl-amino)propyl]-3-phenyloxindole, b.p. 199°-210° C./0.15 mm. Hg; from 1[-(o-chlorobenzyl-methylamino]-3-phenyloxindole and 3-chloro-N,N-diethylpropylamine.

18. 1-[(o-Chlorobenzyl)methylamino]-3-phenyl-3-(2-piperidinoethyl)oxindole, m.p. 118°-120° C.; from 1-[(o-chlorobenzyl)-methylamino]-3-phenyloxindole and N-(2-chloroethyl)piperidine.

19. 1-[(m-Chlorobenzyl)methylamino]-3-[2-(diethylamino)ethyl]-3-phenyloxindole, b.p. 195°-205° C./0.16 mm. Hg; from 1-[(m-chlorobenzyl)methylamino]-3-phenyloxindole and $\beta$-chlorotriethylamine.

20. 1-[(p-Chlorobenzyl)methylamino]-3-[2-(dimethylamino)ethyl]-3-phenyloxindole, m.p. 92°-95° C.; from 1-[(p-chlorobenzyl)methylamino]-3-phenyloxindole and 2-chloro-N,N-dimethylethylamine.

21. 1-[(p-Chlorobenzyl)methylamino]-3-[2-(diethylamino)ethyl]-3-phenyloxindole, b.p. 215°-216° C./0.475 mm. Hg; from 1-[(p-chlorobenzyl)methylamino]-3-phenyloxindole and $\beta$-chlorotriethylamine.

22. 1-[(p-Chlorobenzyl)methylamino]-3-[3-(dimethylamino)propyl]-3-phenyloxindole (monohydrochloride, m.p. 221.5°-224.5° C., crystallized from 2-propanol-ether); from 1-[(p-chlorobenzyl)methylamino]-3-phenyloxindole and 3-chloro-N,N-dimethylpropylamine.

23. 1-[(o-Bromobenzyl)methylamino]-3-[3-(dimethyl-amino)propyl]-3-phenyloxindole; from 1-[(o-bromobenzyl)-methylamino]-3-phenyloxindole and 3-chloro-N,N-dimethyl-propylamine.

24. 1-[(o-Bromobenzyl)methylamino]-3-[2-diethylamino)ethyl]-3-phenyloxindole; from 1-[(o-bromobenzyl)-methylamino]-3-phenyloxindole and $\beta$-chlorotriethylamine.

25. 3-[2-(Diethylamino)ethyl]-1-[(o-fluorobenzyl)-methylamino]-3-phenyloxindole, b.p. 180°-190° C./0.20 mm. Hg; from 1-[(o-fluorobenzyl)methylamino]-3-phenyloxindole and $\beta$-chlorotriethylamine.

26. 3-[2-(Diethylamino)ethyl]-1-[(p-fluorobenzyl)-methylamino]-3-phenyloxindole, b.p. 202°-204° C./0.40 mm. Hg; from 1-[(p-fluorobenzyl)methylamino]-3-phenyloxindole and $\beta$-chlorotriethylamine.

27. 3-[2-(Diethylamino)ethyl]-1-[methyl(o-methylbenzyl)amino]-3-phenyloxindole, b.p. 185°-190° C./0.15 mm. Hg; from 1-[methyl(o-methylbenzyl)amino]-3-phenyloxindole and $\beta$-chlorotriethylamine.

28. 3-[3-(Dimethylamino)propyl]-1-[methyl(o-methylbenzyl)amino]-3-phenyloxindole, b.p. 195°-197° C./0.15 mm. Hg; from 1-[methyl(o-methylbenzyl)amino]-3-phenyloxindole and 3-chloro-N,N-dimethylpropylamine.

29. 3-[2-(Diethylamino)ethyl]-1-{methyl[o-(trifluoromethyl)benzyl]amino}-3-phenyloxindole, b.p. 185°-187° C./0.12 mm. Hg; from 1-{methyl[o-(trifluoromethyl)-benzyl]amino}-3-phenyloxindole and $\beta$-chlorotriethylamine.

30. 3-[2-(Dimethylamino)ethyl]-1-[(o-methoxybenzyl)methylamino]-3-phenyloxindole, b.p. 215°-217° C./0.55 mm. Hg; from 1-[(o-methoxybenzyl)methylamino]-3-phenyloxindole and 2-chloro-N,N-dimethylethylamine.

31. 3-[2-(Diethylamino)ethyl]-1-[(o-methoxybenzyl)methylamino]-3-phenyloxindole (dihydrobromide, m.p. 149.5°-153° C., crystallized from 2-propanol-ether); from 1-[(o-methoxybenzyl)methylamino]-3-phenyloxindole and $\beta$-chlorotriethylamine.

32. 3-[2-(Dimethylamino)ethyl]-1-[(m-methoxybenzyl)methylamino]-3-phenyloxindole, b.p. 175°-180° C./0.125 mm. Hg; from 1-[(m-methoxybenzyl)methylamino]-3-phenyl-oxindole and 2-chloro-N,N-dimethylethylamine.

33. 3-[2-Diethylamino)ethyl]-1-[(m-methoxybenzyl)methylamino]-3-phenyloxindole, b.p. 208°-215° C./0.20 mm. Hg; from 1-[(m-methoxybenzyl)methylamino]-3-phenyl-oxindole and $\beta$-chlorotriethylamine.

34. 3-[3-(Dimethylamino)propyl]-1-[(m-methoxybenzyl)methylamino]-3-phenyloxindole, b.p. 195°-199° C./0.175 mm. Hg; from 1-[(m-methoxybenzyl)methylamino]-3-phenyloxindole and 3-chloro-N,N-dimethylpropylamine.

35. 3-[2-(Dimethylamino)ethyl]-1-[(p-methoxybenzyl)methylamino]-3-phenyloxindole, b.p. 205°-207° C./0.26 mm. Hg; from 1-[(p-methoxybenzyl)methylamino]-3-phenyl-oxindole and 2-chloro-N,N-dimethylethylamine.

36. 3-[2-(Diethylamino)ethyl]-1-[(p-methoxybenzyl)-methylamino]-3-phenyloxindole, b.p. 205°-215° C./0.30 mm. Hg; from 1-[(p-methoxybenzyl)methylamino]-3-phenyloxindole and $\beta$-chlorotriethylamine.

37. 3-[3-(Dimethylamino)propyl]-1-[(p-methoxybenzyl)methylamino]-3-phenyloxindole, b.p. 218°-224° C/0.55 mm. Hg; from 1-[(p-methoxybenzyl)methylamino]-3-phenyl-oxindole and 3-chloro-N,N-dimethylpropylamine.

38. 3-[2-(Diethylamino)ethyl]-1-(o-ethoxybenzyl)-methylamino]-3-phenyloxindole, b.p. 185°-205° C./0.15 mm. Hg; from 1-[(o-ethoxybenzyl)methylamino]-3-phenyloxindole and $\beta$-chlorotriethylamine.

39. 3-[3-(Dimethylamino)propyl]-1-{methyl[o-(methylthio)benzyl]amino}-3-phenyloxindole, m.p. 106.5°–108.5° C.; from 1-{methyl[o-(methylthio)benzyl]amino}-3-phenyloxindole and 3-chloro-N,N-dimethylpropylamine.

40. 3-[2-(Diethylamino)ethyl]-1-{methyl[o-(methylthio)benzyl]amino}-3-phenyloxindole, b.p. 217°–225° C./0.175 mm. Hg; from 1-{methyl[o-(methylthio)benzyl]-amino}-3-phenyloxindole and β-chlorotriethylamine.

41. 3-[3-(Diethylamino)propyl]-1-{methyl[o-(methylthio)benzyl]amino}-3-phenyloxindole, b.p. 218°–222° C./0.20 mm. Hg; from 1-{methyl[o-(methylthio)benzyl]-amino}-3-phenyloxindole and 3-chloro-N,N-diethylpropyl-amine.

42. 1-{Methyl[o-(methylthio)benzyl]amino}-3-phenyl-3-(2-piperidinoethyl)oxindole, m.p. 93.5°–96° C.; from 1-{methyl[o-(methylthio)benzyl]amino}-3-phenyl-oxindole and N-(2-chloroethyl)piperidine.

43. 3-[2-(Hexahydro-1H-azepin-1-yl)ethyl]-1-{methyl[o-(methylthio)benzyl]amino}-3-phenyloxindole, b.p. 245°–259° C./0.40 mm. Hg; from 1-{methyl[o-(methylthio)-benzyl]amino}-3-phenyloxindole and N-(2-chloroethyl)-hexamethyleneimine.

44. 3-[2-(Diethylamino)ethyl]-1-{[o-(ethylthio)-benzyl]methylamino}-3-phenyloxindole, b.p. 227°–229° C./0.35 mm. Hg; from 1-{[o-(ethylthio)benzyl]methylamino}-3-phenyloxindole and β-chlorotriethylamine.

45. 3-[2-(Diethylamino)ethyl]-1-{methyl[o-(propylthio)benyl]amino}-3-phenyloxindole, b.p. 221°–226° C./0.25 mm. Hg; from 1-{methyl[o-(propylthio)benzyl]-amino}-3-phenyloxindole and β-chlorotriethylamine.

46. 1-[(2-Chloro-3-methoxybenzyl)methylamino]-3-[2-(diethylamino)ethyl]-3-phenyloxindole, b.p. 229°–232° C./0.30 mm. Hg; from 1-[(2-chloro-3-methoxybenzyl)-methylamino]-3-phenyloxindole and β-chlorotriethylamine.

47. 3-[2-(Dimethylamino)ethyl]-1-(furfurylmethylamino)-3-phenyloxindole, b.p. 178°–179° C./0.225 mm. Hg; from 1-(furfurylmethylamino)-3-phenyloxindole and 2-chloro-N,N-dimethylethylamine.

48. 3-[2-(Diethylamino)ethyl]-1-(furfurylmethylamino)-3-phenyloxindole, b.p. 185°–186° C./0.30 mm. Hg; from 1-(furfurylmethylamino)-3-phenyloxindole and β-chloro-triethylamine.

49. 3-[3-(Dimethylamino)propyl]-1-furfurylmethylamino)-3-phenyloxindole, b.p. 180.5°–181° C./0.175 mm. Hg; from 1-(furfurylmethylamino)-3-phenyloxindole and 3-chloro-N,N-dimethylpropylamine.

50. 3-[3-(Dimethylamino)propyl]-1-(methyl-2-thenyl-amino)-3-phenyloxindole, m.p. 80°–83.5° C.; from 1-(methyl-2-thenylamino)-3-phenyloxindole and 3-chloro-N,N-dimethyl-propylamine.

51. 3-[2-(Diethylamino)ethyl]-1-(methyl-2-thenylamino)-3-phenyloxindole, m.p. 96°–99° C.; from 1-(methyl-2-thenylamino)-3-phenyloxindole and β-chlorotriethylamine.

52. 3-[2-(Diethylamino)ethyl]-1-{methyl[p-(methyl-thio)benzyl]amino}-3-phenyloxindole, b.p. 214°–221° C./0.225 mm. Hg; from 1-{methyl[p-(methylthio)benzyl]amino}-3-phenyloxindole and β-chlorotriethylamine.

53. 3-[2-(Diethylamino)ethyl]-1-[(2,3-dimethoxybenzyl)methylamino]-3-phenyloxindole, b.p. 222°–223° C./0.45 mm. Hg; from 1-[(2,3-dimethoxybenzyl)methylamino]-3-phenyloxindole and β-chlorotriethylamine.

54. 3-[2-(Diethylamino)ethyl]-1-(methylveratryl-amino)-3-phenyloxindole, b.p. 200°–228° C./0.2 mm. Hg; from 1-(methylveratrylamino)-3-phenyloxindole and β-chloro-triethylamine.

55. 3-[2-(Diethylamino)ethyl]-1-[(2,5-dimethoxybenzyl)methylamino]-3-phenyloxindole, b.p. 200°–210° C./0.175 mm. Hg; from 1-[(2,5-dimethoxybenzyl)methylamino]-3-phenyloxindole and β-chlorotriethylamine.

56. 1-[(2-Chloro-4-methoxybenzyl)methylamino]-3-[2-(diethylamino)ethyl]-3-phenyloxindole, b.p. 216°–220° C./0.4 mm. Hg; from 1-[(2-chloro-4-methoxybenzyl)-methylamino]-3-phenyloxindole and β-chlorotriethylamine.

57. 1-[(4-Chloro-2-methoxybenzyl)methylamino]-3-[2-(diethylamino)ethyl]-3-phenyloxindole, b.p. 188°–190° C./0.4 mm. Hg; from 1-[(4-chloro-2-methoxybenzyl)-methylamino]-3-phenyloxindole and β-chlorotriethylamine.

58. 1-[(5-Chloro-2-methoxybenzyl)methylamino]-3-[2-(diethylamino)ethyl]-3-phenyloxindole, b.p. 222°–231° C./0.45 mm. Hg; from 1-[(5-chloro-2-methoxybenzyl)-methylamino]-3-phenyloxindole and β-chlorotriethylamine.

59. 1-[(2,6-Dichlorobenzyl)methylamino]-3-[2-(diethylamino)ethyl]-3-phenyloxindole, b.p. 218°–224° C./0.2 mm. Hg; from 1-[(2,6-dichlorobenzyl)methylamino]3-phenyl-oxindole and β-chlorotriethylamine.

60. 1-[(2-Chloro-6-fluorobenzyl)methylamino]-3-[2-(diethylamino)ethyl]-3-phenyloxindole, b.p. 186°–187° C./0.01 mm. Hg; from 1-[(2-chloro-6-fluorobenzyl)-methylamino]-3-phenyloxindole and β-chlorotriethylamine.

C. Utilizing the general procedure described in A, the following mixtures of isomeric 1-amino-3-aminoalkyl-3-phenyloxindoles are obtained from the reaction of the 3-phenyloxindole compound and haloalkylamine compound designated below in the presence of sodium hydride. In each case, the molar ratios of the three reactants are approximately those employed in A, and the boiling point given is that of the mixture; no attempt was made to separate the individual isomers.

1. Mixture of 1-(benzylmethylamino)-3-[2-(dimethylamino)-1-methylethyl]-3-phenyloxindole and 1-(benzylmethylamino)-3-[2-dimethylamino)propyl]-3-phenyloxindole, b.p. 180°–183° C./0.35 mm. Hg; from 1-(benzyl-methylamino)-3-phenyl-oxindole and 2-chloro-N,N-dimethylpropylamine.

2. Mixture of 1-[(o-chlorobenzyl)methylamino]-3-[2-(dimethylamino)-1-methylethyl]-3-phenyloxindole and 1-[(o-chlorobenzyl)methylamino]-3-[2-(dimethylamino)propyl]3-phenyloxindole, b.p. 185°–189° C./0.175 mm. Hg; from 1-[(o-chlorobenzyl)methylamino]-3-phenyloxindole and 2-chloro-N,N-dimethylpropylamine.

3. Mixture of 1-[(o-chlorobenzyl)methylamino]-3-[2-(diethylamino)-1-methylethyl]-3-phenyloxindole and 1-[(o-chlorobenzyl)methylamino]-3-[2-(diethylamino)propyl]-3-phenyloxindole, b.p. 205°–210° C./0.175 mm. Hg; from 1-[(o- chlorobenzyl)methylamino]-3-phenyloxindole and 2-chloro-N,N-dimethylpropylamine.

4. Mixture of 3-[2-(dimethylamino)-1-methylethyl]-1-{methyl[o-(methylthio)benzyl]amino}-3-phenyloxindole and 3-[2-(dimethylamino)propyl]-1-{methyl[o-(methylthio)benzyl]-amino}-3-phenyloxindole, b.p. 205°–210° C./0.20 mm. Hg; from 1-{methyl[o-(methylthio)benyl]amino}-3-phenyloxindole and 2-chloro-N,N-dimethylpropylamine.

5. Mixture of 3-[2-(diethylamino)-1-methylethyl]-1-{methyl[o-(methylthio)benzyl]amino}-3-phenyloxindole and 3-[2-(diethylamino)propyl]-1-{methyl[o-(methylthio)benzyl]-amino}-3-phenyloxindole, b.p. 205°–220° C./0.20 mm. Hg; from 1-{methyl[o-(methylthio)benzyl]amino}-3-phenyloxindole and 2-chloro-N,N-diethylpropylamine.

II. 1-Amino-3-phenyloxindoles.

A. 1-[(o-Chlorobenzyl)methylamino]-3-phenyloxindole. To a stirred solution of 212 g. of α-chlorodiphenylacetyl chloride in 2.5 liters of ether at room temperature is added first a solution of 147 g. of 1-(o-chlorobenzyl)-1-methylhydrazine in 400 ml. of tetrahydrofuran and then 185 g. of N-ethylmorpholine. The resulting mixture is stirred and heated under reflux for 16 hours, cooled, and diluted with 1.0 liter of water. The organic phase is separated, washed well with water, dried, and evaporated to dryness under reduced pressure to give a solid residue of 1-[(o-chlorobenzyl)methylamino]-3-phenyloxindole; m.p. 100°–102° C., following crystallization from a mixture of ether, toluene, and methanol.

B. Utilizing the procedure given in II A above, the following 1-amino-3-phenyloxindoles are obtained from the reaction of α-chlorodiphenylacetyl chloride and the substituted hydrazine compound designated below. In each case, the molar ratios of the reactants are approximately equivalent to those employed in II A above, and the solvent given in parentheses following the melting point is the solvent used for crystallization.

1. 1-(Benzylmethylamino)-3-phenyloxindole, m.p. 83°–85 C. (2-propanol); from 1-benzyl-1-methylhydrazine.

2. 1-(Methylphenethylamino)-3-phenyloxindole, m.p. 85°–87° C. (2-propanol); from 1-methyl-1-phenethyl-hydrazine.

3. 1-(Benzylethylamino)-3-phenyloxindole, m.p. 69°–71 C. (2-propanol); from 1-benzyl-1-ethyl-hydrazine.

4. 1-[Methyl(α-methylbenzyl)amino]-3-phenyl-oxindole, m.p. 115°–121° C. (2-propanol); from 1-methyl-1-(α-methylbenzyl)hydrazine.

5. 1-[(m-Chlorobenzyl)methylamino]-3-phenyl-oxindole, m.p. 87°–91° C. (ethanol); from 1-(m-chlorobenzyl)-1-methylhydrazine.

6. 1-[(p-Chlorobenzyl)methylamino]-3-phenyl-oxindole, m.p. 121°–122° C. (2-propanol-methanol); from 1-(p-chlorobenzyl)-1-methylhydrazine.

7. 1-[(o-Bromobenzyl)methylamino]-3-phenyloxindole, m.p. 80°–82° C. (ethanol); from 1-(o-bromobenzyl)-1-methyl-hydrazine.

8. 1-[(o-Fluorobenzyl)methylamino]-3-phenyl-oxindole, m.p. 88°–90° C. (ethanol); from 1-(o-fluorobenzyl)-1-methylhydrazine.

9. 1-[(p-Fluorobenzyl)methylamino]-3-phenyloxindole, m.p. 86°–88° C. (ethanol); from 1-(p-fluorobenzyl)-1-methyl-hydrazine.

10. 1-[Methyl(o-methylbenzyl)amino]-3-phenyloxindole, m.p. 78°–80° C. (ethanol); from 1-methyl-1-(o-methylbenzyl)-hydrazine.

11. 1-{Methyl[o-(trifluoromethyl)benzyl]amino}-3-phenyloxindole, m.p. 84°–86° C. (ethanol); from 1-methyl-1-[o-(trifluoromethyl)benzyl]hydrazine.

12. 1-[(o-Methoxybenzyl)methylamino]-3-phenyloxindole, b.p. 213°–215° C./1.3 mm. Hg; from 1-(o-methoxy-benzyl)-1-methylhydrazine.

13. 1-[(m-Methoxybenzyl)methylamino]-3-phenyloxindole, an oil used without further purification; from 1-(m-methoxybenzyl)-1-methylhydrazine.

14. 1-[(p-Methoxybenzyl)methylamino]-3-phenyloxindole, m.p. 102°–103.5° C. (ethanol); from 1-(p-methoxy-benzyl)-1-methylhydrazine.

15. 1-[(o-Ethoxybenzyl)methylamino]-3-phenyl-oxindole, b.p. 185°–195° C./o.30 mm. Hg; from 1-(o-ethoxy-benzyl)-1-methylhydrazine.

16. 1-{Methyl[o-(methylthio)benzyl]amino}-3-phenyloxindole, m.p. 118°–120° C. (ethanol); from 1-methyl-1-[o-(methylthio)benzyl]hydrazine.

17. 1-{[o-(Ethylthio)benzyl]methylamino}-3-phenyl-oxindole, m.p. 105°–108° C. (methanol); from 1-[o-(ethylthio)-benzyl]-1-methylhydrazine.

18. 1-{Methyl[o-(propylthio)benzyl]amino}-3-phenyloxindole, m.p. 122°–126° C. (ethanol); from 1-methyl-1-[o-(propylthio)benzyl]hydrazine.

19. 1-[(2-Chloro-3-methoxybenzyl)methylamino]-3-phenyloxindole, m.p. 112°–113° C. (ethanol); from 1-(2-chloro-3-methoxybenzyl)-1-methylhydrazine.

20. 1-(Furfurylmethylamino)-3-phenyloxindole, m.p. 91°–93° C. (ethanol); from 1-furfuryl-1-methylhydrazine.

21. 1-(Methyl-2-thenylamino)-3-phenyloxindole, m.p. 126.5°–129° C. (ethanol); from 1-methyl-1-(2-thenyl)hydrazine.

22. 1-{Methyl[p-(methylthio)benzyl]amino}-3-phenyl-oxindole, m.p. 114°–115.5° C. (methanol); from 1-methyl-1-[p-(methylthio)benzyl]hydrazine.

23. 1-[(2,3-Dimethoxybenzyl)methylamino]-3-phenyloxindole, m.p. 87°–92° C. (ethanol); from 1-(2,3-dimethoxybenzyl)-1-methylhydrazine.

24. 1-(Methylveratrylamino)-3-phenyloxindole, m.p. 97°–100° C. (ethanol); from 1-methyl-1-veratryl-hydrazine.

25. 1-[(2,5-Dimethoxybenzyl)methylamino]-3-phenyl-oxindole, m.p. 81.5°–83.5° C. (benzene-petroleum ether); from 1-(2,5-dimethoxybenzyl)-1-methylhydrazine.

26. 1-[(2-Chloro-4-methoxybenzyl)methylamino]-3-phenyloxindole, m.p. 97°–99° C. (benzene-petroleum ether); from 1-(2-chloro-4-methoxybenzyl)-1-methylhydrazine.

27. 1-[(4-Chloro-2-methoxybenzyl)methylamino]-3-phenyloxindole, m.p. 126°–127.5° C. (benzene-petroleum ether); from 1-(4-chloro-2-methoxybenzyl)-1-methylhydrazine.

28. 1-[(5-Chloro-2-methoxybenzyl)methylamino]-3-phenyloxindole, m.p. 90°–93° C. (methanol); from 1-(5-chloro-2-methoxybenzyl)methylhydrazine.

29. 1-[(2,6-Dichlorobenzyl)methylamin]-3-phenyloxindole, m.p. 123°–125° C. (benzene-petroleum ether); from 1-(2,6-dichlorobenzyl)-1-methyl-hydrazine.

30. 1-[(2-Chloro-6-fluorobenzyl)methylamino]-3-phenyloxindole, m.p. 99°–101° C. (isopropanol); from 1-(2-chloro-6-fluorobenzyl)-1-methylhydrazine.

III. Substituted hydrazines.

A. 1-(o-Chlorobenzyl)-1-methylhydrazine. To a stirred mixture consisting of 311 g. of N-methyl-o-chlorobenzyl-amine, 220 ml. of concentrated hydrochloric acid, and 1.5 liters of water, kept in a nitrogen atmosphere, is added dropwise a solution of 150 g. of sodium nitrite in 400 ml. of water. The resulting mixture is stirred at room temperature for 16 hours and extracted well with ether, and the ether extract is washed with 50% aqueous sodium hydroxide, dried, and evaporated to dryness to give N-methyl-N-nitroso-o-chlorobenzylamine, which is purified by distillation; b.p. 95°–97° C./0.4 mm. Hg. This intermediate compound (185 g.) is dissolved in 500 ml. of ether, and the solution is added dropwise with stirring to a suspension of 100 g. of lithium aluminum hydride in a mixture of 1.0 liter of ether and 500 ml. of tetrahydrofuran. The reaction mixture is stirred at room temperature for 16 hours and then under reflux for 20 minutes. Upon cooling, it is treated successively with 105 ml. of water, 79 ml. of 20 percent aqueous sodium hydroxide, and 370 ml. of water. The resulting suspension is filtered to remove insoluble solids, and the filtrate is evaporated under reduced pressure to give 1-(o-chlorobenzyl)-1-methylhydrazine; b.p. 108°–110° C./3 mm. Hg.

B. Utilizing the procedure given in III A above, the following substituted hydrazines are obtained from the initial reaction of the amine compound designated below with sodium nitrite and hydrochloride acid, followed by reaction of the intermediate N-nitrosoamine with lithium aluminum hydride.

1. 1-Methyl-1-phenethylhydrazine, b.p. 103°–105° C./3 mm. Hg; from N-methylphenethylamine.
2. 1-Benzyl-1-ethylhydrazine, b.p. 95°–97° C./6 mm. Hg; from N-ethylbenzylamine.
3. 1-Methyl-1-(α-methylbenzyl)hydrazine, b.p. 89°–90 C./3 mm. Hg; from N-methyl-α-methylbenzylamine.
4. 1-Methyl-1-veratrylhydrazine, b.p. 111°–112° C./0.45 mm. Hg; from N-methylveratrylamine.

C. 1-Methyl-1-[p-(methylthio)benzyl]hydrazine. A mixture of 168 g. of p-(methylthio)benzoic acid and 319 g. of thionyl chloride is heated under reflux until gas evolution ceases, and it is then evaporated under reduced pressure. The residue, which is p-(methylthio)benzoyl chloride, is dissolved in 500 ml. of tetrahydrofuran, and the resulting solution is added dropwise to a stirred solution of 92 g. of methylhydrazine in 370 ml. of water at 5°–10° C. The reaction mixture is stirred for 16 hours at room temperature and is then extracted with ether. The ether extract is dried and evaporated to give a residue of N-methyl-p-(methylthio)benzoic acid hydrazide (147 g.), which is dissolved in 500 ml. of warm tetrahydrofuran, and the resulting solution is added dropwise to a suspension of 72 g. of lithium aluminum hydride in 1.5 liters of tetrahydrofuran heated under reflux. The resulting mixture is heated under reflux for 16 hours, cooled, and treated successively with 76 ml. of water, 180 ml. of 20 percent aqueous sodium hydroxide, and 266 ml. of water. The suspension is then filtered to remove insoluble solids, and the filtrate is evaporated under reduced pressure to give 1-methyl-1-[p-(methylthio)benzyl]hydrazine; b.p. 80°–100° C./0.30 mm. Hg.

D. Utilizing the procedure given in III C above, the following substituted hydrazines are obtained from the reaction of the aryl carboxylic acid compound designated below with thionyl chloride, followed by reaction of the intermediate aryl carboxylic acid chloride with methylhydrazine, and the further reaction of the intermediate aryl carboxylic acid hydrazide with lithium aluminum hydride.

1. 1-Benzyl-1-methylhydrazine, b.p. 103°–105° C./15 mm. Hg; from benzoic acid.
2. 1-(m-Chlorobenzyl)-1-methylhydrazine, b.p. 115°–120° C./8 mm. Hg; from m-chlorobenzoic acid.
3. 1-(p-Chlorobenzyl)-1-methylhydrazine, b.p. 110°–112° C./3 mm. Hg; from p-chlorobenzoic acid.
4. 1-(o-Fluorobenzyl)-1-methylhydrazine, b.p. 102°–104° C./16 mm. Hg; from o-fluorobenzoic acid.
5. 1-(p-Fluorobenzyl)-1-methylhydrazine, b.p. 95°–97 C./11 mm. Hg; from p-fluorobenzoic acid.
6. 1-Methyl-1-(o-methylbenzyl)hydrazine, b.p. 99°–100bL C./9 mm. Hg; from o-toluic acid.
7. 1-(o-Methoxybenzyl)-1-methylhydrazine, b.p. 85°–87 C./1 mm. Hg; from o-anisic acid.
8. 1-(m-Methoxybenzyl)-1-methylhydrazine, b.p. 78°–98 C./0.275 mm. Hg; from m-anisic acid.
9. 1-(p-Methoxybenzyl)-1-methylhydrazine, b.p. 92°–94 C./1.5 mm. Hg; from p-anisic acid.
10. 1-Furfuryl-1-methylhydrazine, b.p. 81°–83° C./17 mm. Hg; from 2-furoic acid.
11. 1-Methyl-1-(2-thenyl)hydrazine, b.p. 101°–107° C./12 mm. Hg; from 2-thenoic acid.

E. 1-Methyl-1-[o-(methylthio)benzyl]hydrazine. A solution of 441 g. of o-(methylthio)benzoic acid and 370 g. of thionyl chloride in 500 ml. of chloroform is heated under reflux until gas evolution ceases and is then evaporated under reduced pressure. The residue, which is o-(methylthio)benzoyl chloride, is dissolved in 1.5 liters of methanol, and the resulting solution is heated under reflux for 30 minutes and is then evaporated under reduced pressure. The residue, which is methyl o-(methylthio)benzoate, is dissolved in 500 ml. of hot toluene, and the solution is added dropwise to a stirred suspension of 72 g. of lithium aluminum hydride in 2.0 liters of ether. The reaction mixture is heated under reflux for 3 hours, cooled, and treated successively with 106 g. of ethyl acetate and 1.4 liters of 6 N hydrochloric acid. The ethereal phase is separated, washed with dilute aqueous sodium hydroxide, dried, and evaporated to give o-(methylthio)benzyl alcohol, which is purified by distillation; b.p. 149°–152° C./8 m.m. Hg. This intermediate product (310 g.) is then dissolved in 1.0 liter of chloroform, to the solution is added a solution of 310 g. of thionyl chloride in 1.0 liter of chloroform, and the resulting mixture is heated under reflux until gas evolution ceases. The solution obtained is evaporated under reduced pressure, and the residue, which is o-(methylthio)benzyl chloride (417 g.), is added to a solution of 322 g. of methylhydrazine in 2.0 liters of ethanol. The resulting mixture is heated under reflux for 2 hours and evaporated under reduced pressure, and the residue is treated with excess aqueous sodium hydroxide. The basic mixture is extracted with ether, and the ether extract is washed with water, dried, and evaporated to give the desired 1-methyl-1-[o-(methylthio)benzyl]hydrazine; b.p. 101°–105° C./0.60 mm. Hg.

F. Utilizing the procedure described in III E above, the following substituted hydrazines are obtained starting with the aryl carboxylic acid designated below and employing the reaction sequence of halogenation, esterification, reduction, halogenation, and reaction with methylhydrazine.

1. 1-(o-Bromobenzyl)-1-methylhydrazine, b.p. 120°–122° C./4 mm. Hg; from o-bromobenzoic acid.
2. 1-Methyl-1-[o-(trifluoromethyl)benzyl]hydrazine, b.p. 98°–102° C./12 mm. Hg; from α,α,α-trifluoro-o-toluic acid.
3. 1-(o-Ethoxybenzyl)-1-methylhydrazine, b.p. 74°–81 C./0.30 mm. Hg; from o-ethoxybenzoic acid.
4. 1-[o-(Ethylthio)benzyl]-1-methylhydrazine, b.p. 92°–104bL C./0.30 mm. Hg; from o-ethylthiobenzoic acid.
5. 1-Methyl-1-[o-(propylthio)benzyl]hydrazine, b.p. 112°–113° C./0.50 mm. Hg; from o-propylthiobenzoic acid.
6. 1-(2-Chloro-3-methoxybenzyl)-1-methylhydrazine, b.p. 102°–103° C./0.60 mm. Hg; from 2-chloro-3-methoxybenzoic acid.
7. 1-(2,3-Dimethoxybenzyl)-1-methylhydrazine, b.p. 90°–94 C./0.15 mm. Hg; from 2,3-dimethoxybenzoic acid.
8. 1-(2,5-Dimethoxybenzyl)-1-methylhydrazine, b.p. 103°–109° C./0.45 mm. Hg; from 2,5-dimethoxybenzoic acid.
9. 1-(2-Chloro-4-methoxybenzyl)-1-methylhydrazine, b.p. 100°–102° C./0.575 mm. Hg; from 2-chloro-4-methoxybenzoic acid.
10. 1-(4-Chloro-2-methoxybenzyl)-1-methylhydrazine, b.p. 91°–94° C./0.45 mm. Hg; from 4-chloro-2-methoxybenzoic acid.
11. 1-(4-Chloro-2-methoxybenzyl)-1-methylhydrazine, b.p. 79°–83° C./0.20 mm. Hg; from 5-chloro-2-methoxybenzoic acid.
12. 1-(2,6-Dichlorobenzyl)-1-methylhydrazine, b.p. 81°–84 C./0.40 mm. Hg; from 2,6-dichlorobenzoic acid.
13. 1-(2-Chloro-6-fluorobenzyl)-1-methylhydrazine, b.p. 96°–97° C./0.40 mm. Hg; from 2-chloro-6-fluorobenzoic acid.

I claim:

1. A member of the class consisting of 1-amino-3-aminoalkyl-3-phenylindoline compounds having in free base form the formula

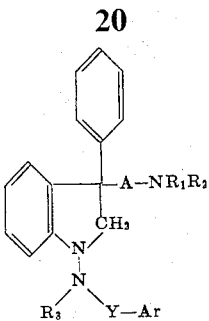

and pharmaceutically-acceptable acid-addition salts thereof; wherein $R_1$ and $R_2$ are members of the class consisting of alkyl radicals having not more than 3 carbon atoms and further members wherein $R_1$ and $R_2$ are combined and together with the nitrogen atom to which they are attached represent a member of the class consisting of 1-pyrrolidinyl, piperidino, hexahydro-1H-azepin-1-yl, 3-methylpiperidino, and 2,6-dimethylpiperidino; $R_3$ is a member of the class consisting of methyl and ethyl; A represents a member of the class consisting of ethylene, propylene, and trimethylene; Y represents a member of the class consisting of methylene, ethylene, and ethylidene; and Ar represents a member of the class consisting of phenyl, monosubstituted phenyl, in which the substituent is selected from the class consisting of fluorine, chlorine, bromine, trifluoromethyl, methyl, methoxy, ethoxy, methylthio, ethylthio, and n-propylthio, dichlorophenyl, chlorofluorophenyl, chloromethoxyphenyl, dimethoxyphenyl, 2-furyl, and 2-thienyl.

2. A compound according to claim 1 which is 1-[(o-chlorobenzyl)methylamino]-3-[2-(diethylamino)ethyl]-3-phenylindoline.

3. A compound according to claim 1 which is 3-[2-(diethylamino)ethyl]-1-[(m-methoxybenzyl)methylamino]-3-phenylindoline.

4. A compound according to claim 1 which is 3-[2-(diethylamino)ethyl]-1-[(p-methoxybenzyl)methylamino]-3-phenylindoline.

5. A compound according to claim 1 which is 3-[2-(diethylamino)ethyl]-1-[(2,3-dimethoxybenzyl)methylamino]-3-phenylindoline.

6. A compound according to claim 1 which is 1-[(2-chloro-3-methoxybenzyl)methylamino]-3-[2-(diethylamino)-ethyl]-3-phenylindoline.

* * * * *